United States Patent
Lohr et al.

(10) Patent No.: US 7,509,554 B2
(45) Date of Patent: Mar. 24, 2009

(54) HARQ PROTOCOL WITH SYNCHRONOUS RETRANSMISSIONS

(75) Inventors: Joachim Lohr, Darmstadt (DE); Eiko Seidel, Darmstadt (DE); Dragan Petrovic, Darmstadt (DE); Hidetoshi Suzuki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 10/583,090

(22) PCT Filed: Dec. 17, 2004

(86) PCT No.: PCT/EP2004/014441

§ 371 (c)(1),
(2), (4) Date: Nov. 6, 2006

(87) PCT Pub. No.: WO2005/060145

PCT Pub. Date: Jun. 30, 2005

(65) Prior Publication Data

US 2007/0168827 A1    Jul. 19, 2007

(30) Foreign Application Priority Data

Dec. 19, 2003    (EP)    ................... 03029411

(51) Int. Cl.
*H03M 13/00*    (2006.01)
*H04L 1/18*    (2006.01)
(52) U.S. Cl. .................... 714/748; 714/751; 714/773
(58) Field of Classification Search ................. 714/748, 714/751, 773
See application file for complete search history.

(56) References Cited

U.S. PATENT DOCUMENTS

| | | | | |
|---|---|---|---|---|
| 5,983,383 | A * | 11/1999 | Wolf | 714/755 |
| 6,018,516 | A | 1/2000 | Packer | |
| 6,426,960 | B2 * | 7/2002 | Antonio | 370/477 |
| 6,671,849 | B2 * | 12/2003 | Tripathi et al. | 714/746 |
| 6,697,988 | B2 | 2/2004 | Kim et al. | |
| 6,977,888 | B1 | 12/2005 | Frenger et al. | |

(Continued)

FOREIGN PATENT DOCUMENTS

EP    1198076 A1 *    4/2002

(Continued)

OTHER PUBLICATIONS

3GPP TS25.401 v6.1.0, Technical Specification, 3rd Generation Partnership Project, Technical Specification Group Radio Access Network, UTRAN Overall Description (Release 6), www.3GPP.com, Jun. 2003, pp. 1-44.

(Continued)

*Primary Examiner*—Joseph D Torres
(74) *Attorney, Agent, or Firm*—Dickinson Wright, PLLC

(57) ABSTRACT

Mobile stations, base stations, radio network controllers and communication systems perform according to the hybrid automatic repeat request (HARQ) protocol for transmitting data packets from a transmitting entity to a receiving entity via a data channel. A HARQ method sending synchronous retransmissions involves a feedback message received from the receiving entity at the transmitting entity and, in case the feedback message indicates that the data packet has not been received successfully, a retransmission data packet is transmitted to the receiving entity after a predetermined time span upon having received the feedback message. The receiving entity soft combines the retransmission data packet with the previously received data packet.

11 Claims, 11 Drawing Sheets

U.S. PATENT DOCUMENTS

| | | | |
|---|---|---|---|
| 6,983,164 B2* | 1/2006 | Kajimura | 455/522 |
| 6,993,342 B2* | 1/2006 | Kuchibhotla et al. | 455/450 |
| 7,003,710 B2 | 2/2006 | Tomaru et al. | |
| 7,054,633 B2 | 5/2006 | Seo et al. | |
| 7,130,652 B2* | 10/2006 | Raaf | 455/522 |
| 7,155,242 B1* | 12/2006 | MacKenzie et al. | 455/466 |
| 7,167,718 B2 | 1/2007 | Hayashi et al. | |
| 2002/0137536 A1 | 9/2002 | Aisaka et al. | |
| 2002/0147819 A1* | 10/2002 | Miyakoshi et al. | 709/228 |
| 2004/0252658 A1* | 12/2004 | Hosein et al. | 370/328 |
| 2005/0226182 A1 | 10/2005 | Itoh | |

FOREIGN PATENT DOCUMENTS

| | | |
|---|---|---|
| EP | 1286491 | 2/2003 |
| JP | 2002190793 | 7/2002 |
| JP | 2002217828 | 8/2002 |
| JP | 2002290262 | 10/2002 |
| WO | 02/089432 | 11/2002 |
| WO | 03021903 | 3/2003 |
| WO | 03036844 | 5/2003 |
| WO | 03096567 | 11/2003 |
| WO | 03096617 | 11/2003 |

OTHER PUBLICATIONS

3GPP TS25.896 v6.0.0, Technical Specification, 3rd Generation Partnership Project, Technical Specification Group Radio Access Network, Feasibility Study for Enhanced Uplink for UTRA FDD (Release 6), www.3GPP.com, Mar. 2004, pp. 1-179.

"Scheduled and Autonomous Mode Operation for the Enhanced Uplink," 3GPP TSG RAN WG1#31, Tdoc R1-03-0284, Tokyo, Japan, Feb. 17-20, 2003, pp. 1-7.

"HARQ Structure," 3GPP TSG-RAN WG1#31, Tdoc R1-030247, Tokyo, Japan, Feb. 18-21, 2003, pp. 1-3.

3GPP TR25.848v4.0.0, Technical Report, 3rd Generation Partnership Project, Technical Specification Group Radio Access Network, Physical Layer Aspects of UTRA High Speed Downlink Packet Access (Release 4), www.3GPP.com, Mar. 2001, pp. 1-88.

PCT International Search Report dated Jun. 6, 2004.

Chase D.: "Code Combining—A Maximum-Likelihood Approach for Combining an Arbitrary Number of Noisy Packets," IEEE Transactions on Communications, IEEE Inc. New York, US, vol. COM-33, No. 5 May 1985, pp. 385-393, XP000758537, ISSN: 0090-6778.

Japanese Office Action dated Jan. 4, 2007 with English translation.

3GPP TR 25.896 v1.1.2, Technical Specification Group Radio Access Network, Feasibility Study for Enhanced Uplink for UTRA FDD (Release 6), www.3gpp.org/ftp/Specs/archive/25_series/25.896/25896-112.zip, Dec. 5, 2003, pp. 19-22, 24-26, 33-36.

"E-DCH L2/L3 issues, MAC multiplexing," 3GPP TSG-RAN WG2 #39, R2-032452, San Diego, USA, Nov. 17-21, 2003, 2 pages.

"Mac Considerations for E-DCH," 3GPP TSG-RAN WG2#38, R2-32230, Sophia-Antipolis, France, Oct. 6-10, 2003, 2 pages.

"Reference Node-B Schedule for EUL," 3GPP TSG-RAN1#35, R1-031246, Lisbon, Portugal, Nov. 17-21, 2003, pp. 1-5.

Japanese Office Action dated Oct. 2, 2007 with English translation.

3GPP RAN1 #30, "AH64: Uplink HARQ Schemes and SHO Considerations," Enhanced Uplink Dedicated Transport Channel, Motorola, Jan. 7-11, 2003, pp. 1-6.

Japanese Office Action dated Feb. 12, 2008 with English Translation.

* cited by examiner

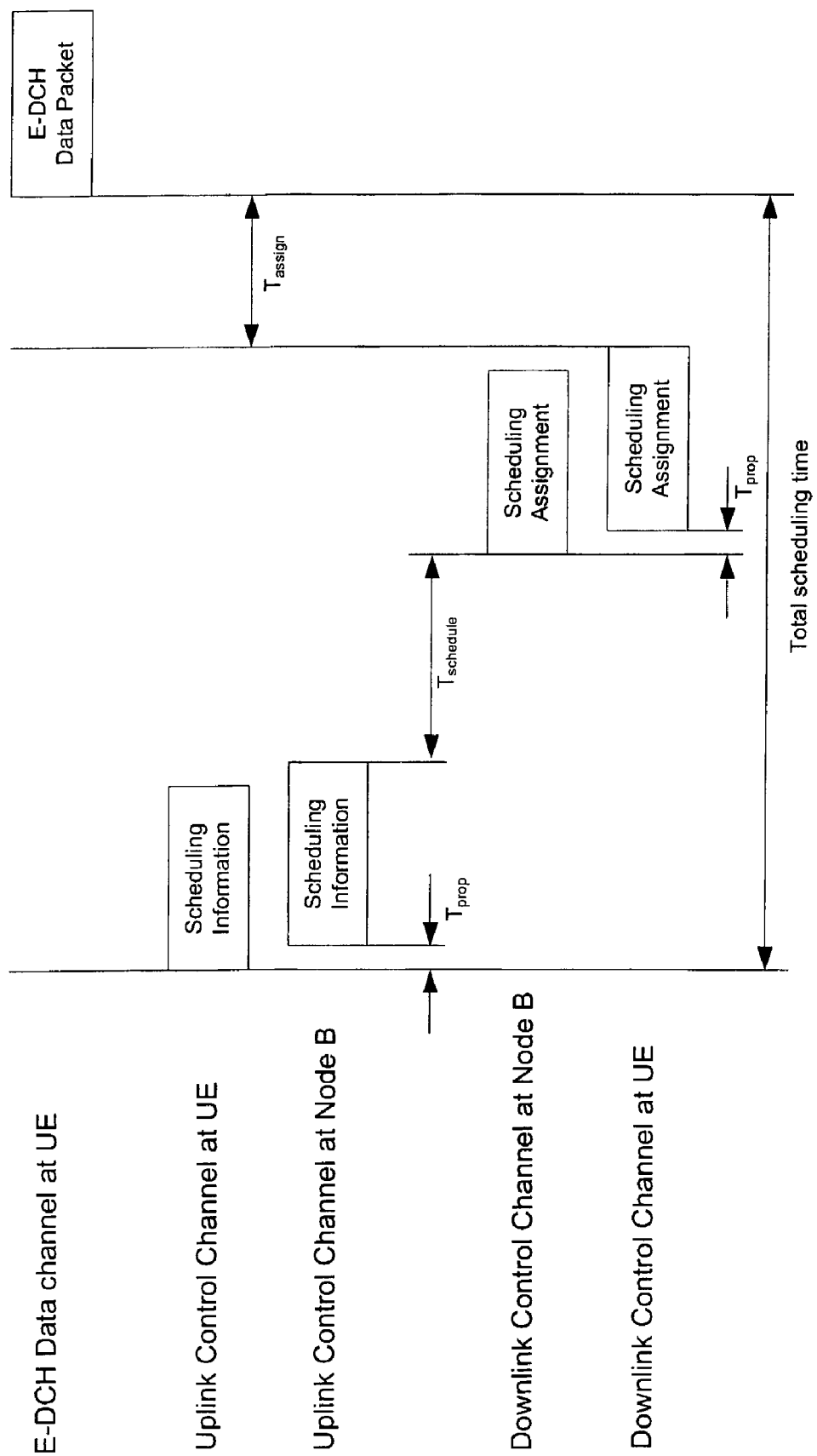

HARQ PROTOCOL WITH SYNCHRONOUS RETRANSMISSIONS

FIELD OF THE INVENTION

The present invention relates to a hybrid automatic repeat request (HARQ) method for transmitting data packets from a transmitting entity to a receiving entity via a data channel. Further, the present invention is related to mobile stations, base stations, radio network controllers and communication systems performing in the HARQ method.

TECHNICAL BACKGROUND

W-CDMA (Wideband Code Division Multiple Access) is a radio interface for IMT-2000 (International Mobile Communication), which was standardized for use as the $3^{rd}$ generation wireless mobile telecommunication system. It provides a variety of services such as voice services and multimedia mobile communication services in a flexible and efficient way. The standardization bodies in Japan, Europe, USA, and other countries have jointly organized a project called the $3^{rd}$ Generation Partnership Project (3GPP) to produce common radio interface specifications for W-CDMA.

The standardized European version of IMT-2000 is commonly called UMTS (Universal Mobile Telecommunication System). The first release of the specification of UMTS has been published in 1999 (Release 99). In the mean time several improvements to the standard have been standardized by the 3GPP in Release 4 and Release 5 and discussion on further improvements is ongoing under the scope of Release 6.

The dedicated channel (DCH) for downlink and uplink and the downlink shared channel (DSCH) have been defined in Release 99 and Release 4. In the following years, the developers recognized that for providing multimedia services—or data services in general—high speed asymmetric access had to be implemented. In Release 5 the high-speed downlink packet access (HSDPA) was introduced. The new high-speed downlink shared channel (HS-DSCH) provides downlink high-speed access to the user from the UMTS Radio Access Network (RAN) to the communication terminals, called user equipments in the UMTS specifications.

The most common technique for error detection of non-real time services is based on Automatic Repeat reQuest (ARQ) schemes, which are combined with Forward Error Correction (FEC), called Hybrid ARQ. If Cyclic Redundancy Check (CRC) detects an error, the receiver requests the transmitter to send additional bits or a new data packet. From different existing schemes the stop-and-wait (SAW) and selective-repeat (SR) continuous ARQ are most often used in mobile communication.

A data unit will be encoded before transmission. Depending on the bits that are retransmitted three different types of ARQ may be defined.

In HARQ Type I the erroneous data packets received, also called PDUs (Packet Data Unit) are discarded and new copy of that PDU is retransmitted and decoded separately. There is no combining of earlier and later versions of that PDU. Using HARQ Type II the erroneous PDU that needs to be retransmitted is not discarded, but is combined with some incremental redundancy bits provided by the transmitter for subsequent decoding. Retransmitted PDU sometimes have higher coding rates and are combined at the receiver with the stored values. That means that only little redundancy is added in each retransmission.

Finally, HARQ Type III is almost the same packet retransmission scheme as Type II and only differs in that every retransmitted PDU is self-decodable. This implies that the PDU is decodable without the combination with previous PDUs. In case some PDUs are heavily damaged such that almost no information is reusable self decodable packets can be advantageously used.

When employing chase-combining the retransmission packets carry identical symbols. In this case the multiple received packets are combined either by a symbol-by-symbol or by a bit-by-bit basis (see D. Chase: "Code combining: A maximum-likelihood decoding approach for combining an arbitrary number of noisy packets", IEEE Transactions on Communications, Col. COM-33, pages 385 to 393, May 1985). These combined values are stored in the soft buffers of respective HARQ processes.

Packet Scheduling

Packet scheduling may be a radio resource management algorithm used for allocating transmission opportunities and transmission formats to the users admitted to a shared medium. Scheduling may be used in packet based mobile radio networks in combination with adaptive modulation and coding to maximize throughput/capacity by e.g. allocating transmission opportunities to the users in favorable channel conditions. The packet data service in UMTS may be applicable for the interactive and background traffic classes, though it may also be used for streaming services. Traffic belonging to the interactive and background classes is treated as non real time (NRT) traffic and is controlled by the packet scheduler. The packet scheduling methodologies can be characterized by:

Scheduling period/frequency: The period over which users are scheduled ahead in time.

Serve order: The order in which users are served, e.g. random order (round robin) or according to channel quality (C/I or throughput based).

Allocation method: The criterion for allocating resources, e.g. same data amount or same power/code/time resources for all queued users per allocation interval.

The packet scheduler for uplink is distributed between Radio Network Controller (RNC) and user equipment in 3GPP UMTS R99/R4/R5. On the uplink, the air interface resource to be shared by different users is the total received power at a Node B, and consequently the task of the scheduler is to allocate the power among the user equipment(s). In current UMTS R99/R4/R5 specifications the RNC controls the maximum rate/power a user equipment is allowed to transmit during uplink transmission by allocating a set of different transport formats (modulation scheme, code rate, etc.) to each user equipment.

The establishment and reconfiguration of such a TFCS (transport format combination set) may be accomplished using Radio Resource Control (RRC) messaging between RNC and user equipment. The user equipment is allowed to autonomously choose among the allocated transport format combinations based on its own status e.g. available power and buffer status. In current UMTS R99/R4/R5 specifications there is no control on time imposed on the uplink user equipment transmissions. The scheduler may e.g. operate on transmission time interval basis.

UMTS Architecture

The high level R99/4/5 architecture of Universal Mobile Telecommunication System (UMTS) is shown in FIG. 1 (see 3GPP TR 25.401: "UTRAN Overall Description", available from http://www.3gpp.org). The network elements are functionally grouped into the Core Network (CN) 101, the UMTS Terrestrial Radio Access Network (UTRAN) 102 and the User Equipment (UE) 103. The UTRAN 102 is responsible for handling all radio-related functionality, while the CN 101 is responsible for routing calls and data connections to external networks. The interconnections of these network elements are defined by open interfaces (Iu, Uu). It should be noted that UMTS system is modular and it is therefore possible to have several network elements of the same type.

FIG. 2 illustrates the current architecture of UTRAN. A number of Radio Network Controllers (RNCs) 201, 202 are connected to the CN 101. Each RNC 201, 202 controls one or several base stations (Node Bs) 203, 204, 205, 206, which in turn communicate with the user equipments. An RNC controlling several base stations is called Controlling RNC (C-RNC) for these base stations. A set of controlled base stations accompanied by their C-RNC is referred to as Radio Network Subsystem (RNS) 207, 208. For each connection between User Equipment and the UTRAN, one RNS is the Serving RNS (S-RNS). It maintains the so-called Iu connection with the Core Network (CN) 101. When required, the Drift RNS 302 (D-RNS) 302 supports the Serving RNS (S-RNS) 301 by providing radio resources as shown in FIG. 3. Respective RNCs are called Serving RNC (S-RNC) and Drift RNC (D-RNC). It is also possible and often the case that C-RNC and D-RNC are identical and therefore abbreviations S-RNC or RNC are used.

Enhanced Uplink Dedicated Channel (E-DCH)

Uplink enhancements for Dedicated Transport Channels (DTCH) are currently studied by the 3GPP Technical Specification Group RAN (see 3GPP TR 25.896: "Feasibility Study for Enhanced Uplink for UTRA FDD (Release 6)", available at http://www.3gpp.org). Since the use of IP-based services become more important, there is an increasing demand to improve the coverage and throughput of the RAN as well as to reduce the delay of the uplink dedicated transport channels. Streaming, interactive and background services could benefit from this enhanced uplink.

One enhancement is the usage of adaptive modulation and coding schemes (AMC) in connection with Node B controlled scheduling, thus an enhancement of the Uu interface. In the existing R99/R4/R5 system the uplink maximum data rate control resides in the RNC. By relocating the scheduler in the Node B the latency introduced due to signaling on the interface between RNC and Node B may be reduced and thus the scheduler may be able to respond faster to temporal changes in the uplink load. This may reduce the overall latency in communications of the user equipment with the RAN. Therefore Node B controlled scheduling is capable of better controlling the uplink interference and smoothing the noise rise variance by allocating higher data rates quickly when the uplink load decreases and respectively by restricting the uplink data rates when the uplink load increases. The coverage and cell throughput may be improved by a better control of the uplink interference.

Another technique, which may be considered to reduce the delay on the uplink, is introducing a shorter TTI (Transmission Time Interval) length for the E-DCH compared to other transport channels. A transmission time interval length of 2 ms is currently investigated for use on the E-DCH, while a transmission time interval of 10 ms is commonly used on the other channels. Hybrid ARQ, which was one of the key technologies in HSDPA, is also considered for the enhanced uplink dedicated channel. The Hybrid ARQ protocol between a Node B and a user equipment allows for rapid retransmissions of erroneously received data units, and may thus reduce the number of RLC (Radio Link Control) retransmissions and the associated delays. This may improve the quality of service experienced by the end user.

To support enhancements described above, a new MAC sub-layer is introduced which will be called MAC-eu in the following (see 3GPP TSG RAN WG1, meeting #31, Tdoc R01-030284, "Scheduled and Autonomous Mode Operation for the Enhanced Uplink"). The entities of this new sub-layer, which will be described in more detail in the following sections, may be located in user equipment and Node B. On user equipment side, the MAC-eu performs the new task of multiplexing upper layer data (e.g. MAC-d) data into the new enhanced transport channels and operating HARQ protocol transmitting entities.

E-DCH MAC Architecture at the User Equipment

FIG. 4 shows the exemplary overall E-DCH MAC architecture on user equipment side. A new MAC functional entity, the MAC-eu 503, is added to the MAC architecture of Rel/ 99/4/5, which includes RLC and higher layer entities 501, MAC-d 502 and physical layer 504. The MAC-eu 503 entity is depicted in more detail in FIG. 5.

There are M different data flows (MAC-d) carrying data packets to be transmitted from user equipment to Node B. These data flows can have different QoS (Quality of Service), e.g. delay and error requirements, and may require different configurations of HARQ instances. Therefore the data packets can be stored in different Priority Queues. The set of HARQ transmitting and receiving entities, located in user equipment and Node B respectively will be referred to as HARQ process. The scheduler will consider QoS parameters in allocating HARQ processes to different priority queues. MAC-eu entity receives scheduling information from Node B (network side) via Layer 1 signaling.

E-DCH MAC Architecture at the UTRAN

In soft handover operation the MAC-eu entities in the E-DCH MAC Architecture at the UTRAN side may be distributed across Node B (MAC-eub) and S-RNC (MAC-eur). The scheduler in Node B chooses the active users and performs rate control by determining and signaling a commanded rate, suggested rate or TFC (Transport Format Combination) threshold that limits the active user (UE) to a subset of the TCFS (Transport Format Combination Set) allowed for transmission.

Every MAC-eu entity corresponds to a user (UE). In FIG. 6 the Node B MAC-eu architecture is depicted in more detail. It can be noted that each HARQ Receiver entity is assigned certain amount or area of the soft buffer memory for combining the bits of the packets from outstanding retransmissions. Once a packet is received successfully, it is forwarded to the reordering buffer providing the in-sequence delivery to upper layer. According to the depicted implementation, the reordering buffer resides in S-RNC during soft handover (see 3GPP TSG RAN WG 1, meeting #31: "HARQ Structure", Tdoc R1-030247, available of http://www.3gpp.org). In FIG. 7 the S-RNC MAC-eu architecture which comprises the reordering buffer of the corresponding user (UE) is shown. The number of reordering buffers is equal to the number of data flows in the corresponding MAC-eu entity on user equipment side. Data and control information is sent from all Node Bs within Active Set to S-RNC during soft handover.

It should be noted that the required soft buffer size depends on the used HARQ scheme, e.g. an HARQ scheme using incremental redundancy (IR) requires more soft buffer than one with chase combining (CC).

E-DCH Signaling

E-DCH associated control signaling required for the operation of a particular scheme consists of uplink and downlink signaling. The signaling depends on uplink enhancements being considered.

In order to enable Node B controlled scheduling (e.g. Node B controlled time and rate scheduling), user equipment has to send some request message on the uplink for transmitting data to the Node B. The request message may contain status information of a user equipment e.g. buffer status, power status, channel quality estimate. The request message is in the following referred to as Scheduling Information (SI). Based on this information a Node B can estimate the noise rise and schedule the UE. With a grant message sent in the downlink from the Node B to the UE, the Node B assigns the UE the TFCS with maximum data rate and the time interval, the UE is allowed to send. The grant message is in the following referred to as Scheduling Assignment (SA).

In the uplink user equipment has to signal Node B with a rate indicator message information that is necessary to decode the transmitted packets correctly, e.g. transport block size (TBS), modulation and coding scheme (MCS) level, etc. Furthermore, in case HARQ is used, the user equipment has to signal HARQ related control information (e.g. Hybrid ARQ process number, HARQ sequence number referred to as New Data Indicator (NDI) for UMTS Rel. 5, Redundancy version (RV), Rate matching parameters etc.)

After reception and decoding of transmitted packets on enhanced uplink dedicated channel (E-DCH) the Node B has to inform the user equipment if transmission was successful by respectively sending ACK/NAK in the downlink.

E-DCH—Node B Controlled Scheduling

Node B controlled scheduling is one of the technical features for E-DCH which is foreseen to enable more efficient use of the uplink power resource in order to provide a higher cell throughput in the uplink and to increase the coverage. The term "Node B controlled scheduling" denotes the possibility for the Node B to control, within the limits set by the RNC, the set of TFCs from which the UE may choose a suitable TFC. The set of TFCs from which the UE may choose autonomously a TFC is in the following referred to as "Node B controlled TFC subset". "Node B controlled TFC subset" is a subset of the TFCS configured by RNC as seen in FIG. 8. The UE selects a suitable TFC from the "Node B controlled TFC subset" employing the Rel5 TFC selection algorithm. Any TFC in the "Node B controlled TFC subset" might be selected by the UE, provided there is sufficient power margin, sufficient data available and TFC is not in the blocked state. Two fundamental approaches to scheduling UE transmission for the E-DCH exist. The scheduling schemes can all be viewed as management of the TFC selection in the UE and mainly differs in how the Node B can influence this process and the associated signaling requirements.

Node B Controlled Rate Scheduling

The principle of this scheduling approach is to allow Node B to control and restrict the transport format combination selection of the user equipment by fast TFCS restriction control. A Node B may expand/reduce the "Node B controlled subset", which user equipment can choose autonomously on suitable transport format combination from, by Layer-1 signaling. In Node B controlled rate scheduling all uplink transmissions may occur in parallel but at a rate low enough such that the noise rise threshold at the Node B is not exceeded. Hence, transmissions from different user equipments may overlap in time. With Rate scheduling a Node B can only restrict the uplink TFCS but does not have any control of the time when UEs are transmitting data on the E-DCH. Due to Node B being unaware of the number of UEs transmitting at the same time no precise control of the uplink noise rise in the cell may be possible (see 3GPP TR 25.896: "Feasibility study for Enhanced Uplink for UTRA FDD (Release 6)", version 1.0.0, available at http://www.3gpp.org).

Two new Layer-1 messages are introduced in order to enable the transport format combination control by Layer-1 signaling between the Node B and the user equipment. A Rate Request (RR) may be sent in the uplink by the user equipment to the Node B. With the RR the user equipment can request the Node B to expand/reduce the "Node controlled TFC Subset" by one step. Further, a Rate Grant (RG) may be sent in the downlink by the Node B to the user equipment. Using the RG, the Node B may change the "Node B controlled TFC Subset", e.g. by sending up/down commands. The new "Node B controlled TFC Subset" is valid until the next time it is updated.

Node B Controlled Rate and Time Scheduling

The basic principle of Node B controlled time and rate scheduling is to allow (theoretically only) a subset of the user equipments to transmit at a given time, such that the desired total noise rise at the Node B is not exceeded. Instead of sending up/down commands to expand/reduce the "Node B controlled TFC Subset" by one step, a Node B may update the transport format combination subset to any allowed value through explicit signaling, e.g. by sending a TFCS indicator (which could be a pointer).

Furthermore, a Node B may set the start time and the validity period a user equipment is allowed to transmit. Updates of the "Node B controlled TFC Subsets" for different user equipments may be coordinated by the scheduler in order to avoid transmissions from multiple user equipments overlapping in time to the extent possible. In the uplink of CDMA systems, simultaneous transmissions always interfere with each other. Therefore by controlling the number of user equipments, transmitting simultaneously data on the E-DCH, Node B may have more precise control of the uplink interference level in the cell. The Node B scheduler may decide which user equipments are allowed to transmit and the corresponding TFCS indicator on a per transmission time interval (TTI) basis based on, for example, buffer status of the user equipment, power status of the user equipment and available interference Rise over Thermal (RoT) margin at the Node B.

Two new Layer-1 messages are introduced in order to support Node B controlled time and rate scheduling. A Scheduling Information Update (SI) may be sent in the uplink by the user equipment to the Node B. If user equipment finds a need for sending scheduling request to Node B (for example new data occurs in user equipment buffer), a user equipment may transmit required scheduling information. With this scheduling information the user equipment provides Node B information on its status, for example its buffer occupancy and available transmit power.

A Scheduling assignment (SA) may be transmitted in the downlink from a Node B to a user equipment. Upon receiving the scheduling request the Node B may schedule a user equipment based on the scheduling information (SI) and parameters like available RoT margin at the Node B. In the Scheduling Assignment (SA) the Node B may signal the TFCS indicator and subsequent transmission start time and validity period to be used by the user equipment.

Node B controlled time and rate scheduling provides a more precise RoT control compared to the rate-only controlled scheduling as already mentioned before. However this more precise control of the interference at this Node B is obtained at the cost of more signaling overhead and scheduling delay (scheduling request and scheduling assignment messages) compared to rate control scheduling.

In FIG. 9 a general scheduling procedure with Node B controlled time and rate scheduling is shown. When a user equipment wants to be scheduled for transmission of data on E-DCH it first sends a scheduling request to Node B. $T_{prop}$ denotes here the propagation time on the air interface. The contents of this scheduling request are information (scheduling information) for example buffer status and power status of the user equipment. Upon receiving that scheduling request, the Node B may process the obtained information and determine the scheduling assignment. The scheduling will require the processing time $T_{schedule}$.

The scheduling assignment, which comprises the TFCS indicator and the corresponding transmission start time and validity period, may be then transmitted in the downlink to the user equipment. After receiving the scheduling assignment the user equipment will start transmission on E-DCH in the assigned transmission time interval.

The use of either rate scheduling or time and rate scheduling may be restricted by the available power as the E-DCH will have to co-exist with a mix of other transmissions by the user equipments in the uplink. The co-existence of the different scheduling modes may provide flexibility in serving different traffic types. For example, traffic with small amount of data and/or higher priority such as TCP ACK/NACK may be sent using only a rate control mode with autonomous transmissions compared to using time and rate-control scheduling. The former would involve lower latency and lower signaling overhead.

E-DCH—Hybrid ARQ

Node B controlled Hybrid ARQ may allow rapid retransmissions of erroneously received data packets. Fast retransmissions between a user equipment and a Node B may reduce the number of higher layer retransmissions and the associated delays, thus the quality perceived by the end user may be improved.

A protocol structure with multiple stop-and-wait (SAW) Hybrid ARQ processes can be used for E-DCH, similar to the scheme employed for the downlink HS-DSCH in HSDPA, but with appropriate modifications motivated by the differences between uplink and downlink (see 3GPP TR 25.896).

An N-channel SAW scheme consists of N parallel HARQ process, each process works as a stop-and-wait retransmission protocols, which corresponds to a selective repeat ARQ (SR) with window size 1. It is assumed that user equipment can only transmit data on a single HARQ process each transmission time interval.

In FIG. 10 an example N-channel SAW protocol with N=3 HARQ processes is illustrated. A user equipment is transmitting data packet 1 on E-DCH on the uplink to the Node B. The transmission is carried out on the first HARQ process. After propagation delay of the air interface $T_{prop}$ the Node B receives the packet and starts demodulating and decoding.

Depending on whether the decoding was successful an ACK/NACK is sent in the downlink to the user equipment.

In this example Node B sends an ACK after $T_{NBprocess}$, which denotes the time required for decoding and processing the received packet in Node B, to the user equipment. Based on the feedback on the downlink the user equipment decides whether it resends the data packet or transmits a new data packet. The processing time available for the user equipment between receiving the ACKnowledgement and transmitting the next transmission time interval in the same HARQ process is denoted $T_{UEprocess}$.

In the example user equipment transmits data packet 4 upon receiving the ACK. The round trip time (RTT) denotes the time between transmission of a data packet in the uplink and sending a retransmission of that packet or a new data packet upon receiving the ACK/NACK feedback for that packet. To avoid idle periods due to lack of available HARQ processes, it is necessary that the number N of HARQ processes matches to the HARQ round trip time (RTT).

Considering known and unknown transmission timing, it may be distinguished between synchronous and asynchronous data transmission. A retransmission protocol with asynchronous data transmission uses an explicit signaling to identify a data block or the HARQ process, whereas in a protocol with synchronous data transmission, a data block or HARQ process is identified based on the time point a data block is received.

A UE may for example have to signal the HARQ process number explicitly in a protocol with asynchronous data transmission in order to ensure correct soft combining of data packets in case of a retransmission. The advantage of a HARQ retransmission protocol with asynchronous data transmission is the flexibility, which is given to the system. The Node B scheduler may for example assign UEs a time period and HARQ processes for the transmission of data on the E-DCH based on the interference situation in the cell and further parameters like priority or QoS parameters of the corresponding E-DCH service.

A retransmission protocol with asynchronous HARQ feedback information uses sequence numbers (SN) or other explicit identification of the feedback messages whereas protocols with synchronous HARQ feedback information identifies the feedback messages based on the time when they are received, as for example in HSDPA. Feedback may sent on the HS-DPCCH after a certain time instant upon having received the HS-DSCH (see 3GPP TR 25.848: "Physical Layer Aspects of High Speed Downlink Packet Access", version 5.0.0, available at http://www.3gpp.org).

Radio Bearer Configuration—Radio Bearer Establishment

Before starting of any transmission a data channel, e.g. a radio bearer in UMTS, is established and all layers should be configured accordingly. The procedures for establishing radio bearers may vary according to the relation between the radio bearer and a dedicated transport channel. Depending on the Quality of Service (QoS) parameters, there may or may not be a permanently allocated dedicated channel associated with the radio bearer (RB).

Radio Bearer Configuration—Radio Bearer Establishment with Dedicated Physical Channel Activation In UMTS the procedure in FIG. 12 may be applied when a new physical channel needs to be created for the radio bearer. A Radio Bearer Establishment is initiated when an RB Establish Request primitive is received from the higher layer Service Access Point on the network side of the RRC layer. This primitive contains a bearer reference and QoS parameters. Based on these QoS parameters, Layer 1 and Layer 2 parameters are chosen by the RRC entity on the network side.

The physical layer processing on the network side is started with the CPHY-RL-Setup request primitive issued to all applicable Node Bs. If any of the intended recipients is/are unable to provide the service, it will be indicated in the confirmation primitive(s). After setting up Layer 1 including the start of transmission and reception in Node B, the NW-RRC sends a RADIO BEARER SETUP message to its peer entity (acknowledged or unacknowledged transmission optional for the network (NW)). This message may comprise Layer 1, MAC and RLC parameters. After receiving the message, the user equipment-RRC configures Layer 1 and MAC.

Upon Layer 1 synchronization being indicated, the user equipment transmits a RADIO BEARER SETUP COMPLETE message in acknowledged-mode back to the network. The NW-RRC configures MAC and RLC on the network side.

Upon receiving the confirmation for the RADIO BEARER SETUP COMPLETE, the user equipment-RRC creates a new RLC entity associated with the new radio bearer. The applicable method of RLC establishment may depend on RLC transfer mode. The RLC connection can be either implicitly established, or explicit signaling may be applied. Finally, an RB Establish Indication primitive is sent by user equipment-RRC and an RB Establish Confirmation.

As mentioned before a retransmission protocol with asynchronous data transmission enables the Node B more scheduling flexibility. The scheduling assignment can for example be based on the scheduling information sent from a user equipment and the interference situation in the cell.

However there might be some drawbacks if retransmissions are also sent in an asynchronous manner. In case transmission on E-DCH is carried out in the time and rate controlled scheduling mode the retransmissions are scheduled as well. That means, retransmissions are treated like any other transmissions, e.g. initial transmissions. user equipment has to send a scheduling request to Node B first. Upon having received the scheduling information (SI) comprised within the scheduling request, the receiving Node B assigns transmission resources to the user equipment.

Using a Scheduling Assignment (SA) message the Node B signals the TFCS indicator and subsequent transmission start time and validity period to be used for the retransmission by the user equipment. The scheduling of retransmissions involves a scheduling delay as already depicted in FIG. 9 for initial transmissions.

Moreover, the scheduling flexibility for retransmissions is also obtained at the cost of additional signaling (Scheduling Request message and Scheduling Assignment message) as for the transmission of initial packets.

Another problem, which may exits if retransmissions are scheduled, is that retransmissions are not necessarily prioritized. Instead of assigning resources for pending retransmissions, a Node B scheduler could allow other user equipments to send initial transmissions of data packets. Hence, data pending for retransmission suffer from an increased delay. This problem could even become more severe in case not only the pending retransmissions are affected by this increased delay. The end user performance could for example be affected if retransmissions are delayed as shown in the following.

Since data packets has to be delivered in-sequence to higher layers on receiver side (delivery of packets to RLC layer has to be in-sequence), data packets already correctly decoded on receiver side cannot be released from the reordering buffer as long as data packets with lower sequence numbers are still pending in the HARQ entity.

In case the retransmissions of these data packets with lower sequence numbers are delayed due to the fact that other user equipments are scheduled for initial transmissions instead, the end user performance is affected by this increased delay in consequence.

SUMMARY OF THE INVENTION

The object of the present invention is to provide a new HARQ scheme employing soft combining of data packets overcoming at least one of the above mentioned problems.

The object is solved by the subject matters of the independent claims. Preferred embodiments of the present invention are subject matters to the dependent claims.

According to a first embodiment the present invention provides a hybrid automatic repeat request (HARQ) method for transmitting data packets from a transmitting entity to a receiving entity via a data channel. The transmitting entity may receive a feedback message from the receiving entity. The feedback message may indicate whether a data packet has been successfully received by the receiving entity.

In case the feedback message indicates that the data packet has not been received successfully, a retransmission data packet may be transmitted to the receiving entity after a predetermined time span upon having received the feedback message, and the receiving entity may perform soft combining of the retransmission data packet with the previously received data packet. It should be noted, that the HARQ protocol proposed is applicable to being employed on the downlink (base station/Node B to mobile station/UE) as well as on the uplink (mobile station/UE to base station/Node B).

The retransmission data packet may be transmitted at the beginning of a transmission time interval, i.e. the duration of the predetermined time span may be chosen such that its end coincides with the beginning of transmission time interval.

Further, the predetermined time span may be selected to be larger or equal to the processing time required for processing the feedback message. Thus, it may be ensured that processing of the feedback message may be performed before sending the retransmission data.

According to a further embodiment, a scheduling entity controlling air interface resources for data transmissions may reserve resources for transmitting the retransmission data packet after the predetermined time span on the air interface.

Moreover, in another embodiment of the present invention, the transmitting entity may determine whether the resources allocated to the transmitting entity are sufficient to transmit the retransmission data packet after the predetermined time span in a transmission time interval and other data pending for transmission in the same transmission time interval. The data pending for transmission may have a higher transmission priority than the retransmission data packet. In the latter case and if the resources are not sufficient, the data pending for transmission may be transmitted in the transmission time interval and the transmission of the retransmission data packet may be postponed to a later transmission time interval.

The resources assigned to the transmitting entity may e.g. be the transport format combinations (TFCs) allocated to the transmitting entity, i.e. the transport format combination set (TFCS).

In another embodiment, the transmitting entity may determine whether the transmission power required for simultaneously transmitting the retransmission data packet after the predetermined time span and data pending for transmission is lower than a maximum transmission power allocated to the transmitting entity. In this embodiment, the data pending transmission may have a higher transmission priority than the retransmission data packet.

The data pending for transmission and the retransmission data packet after the predetermined time span may be transmitted using the allocated maximum transmission power, if the required transmission power is larger than the allocated maximum transmission power.

In a further embodiment, the retransmission data packet may be transmitted at a power level lower than required for its transport format (TF).

According to a further embodiment, the data pending for transmission may be transmitted and the transmission of the retransmission data packet may be aborted after the predetermined time span, if the transmission power required for simultaneously transmitting the retransmission data packet after the predetermined time span and data pending for transmission is larger than the allocated maximum transmission power.

In another embodiment, data transmission is performed in the time and rate controlled scheduling mode. In this embodiment, a scheduling request message may be transmitted from the transmitting entity to a scheduling entity to request resources for transmitting the retransmission data packet, the transmission of which has been aborted.

In a further embodiment, data transmission is performed in the time and rate controlled scheduling mode. In this embodiment, the receiving entity may expect the scheduling request message from the transmitting entity and may maintain the content of a buffer temporarily storing the data packet for which a feedback message has been transmitted to the transmitting entity, if the retransmission data packet is not received after the predetermined time span.

According to another embodiment of the present invention in which data transmission is performed in the rate controlled scheduling mode and the retransmission data packet could not be transmitted after the predetermined time span, the retransmission data packet may be transmitted at a point in time after the elapse of the predetermined time span.

In this case, the receiving entity may expect the retransmission data packet from the transmitting entity and may maintain the content of a buffer temporarily storing the data packet for which a feedback message has been transmitted to the transmitting entity, if the retransmission data packet is not received after the predetermined time span. Thus, again the soft buffer at the receiving entity is not flushed but the data therein are maintained for soft combining.

In a further embodiment, data transmission is carried out on an enhanced uplink dedicated transport channel E-DCH.

According to a further embodiment of the present invention a mobile station for transmitting data packets to a base station using a HARQ retransmission protocol applying soft combining of data packets in a mobile wireless communication system comprising the mobile station and the base station is provided. The mobile station may comprise receiving means for receiving a feedback message from the receiving entity at the transmitting entity, wherein the feedback message indicates whether a data packet has been successfully received by the receiving entity, and transmitting means for transmitting a retransmission data packet after a predetermined time span upon having received the feedback message, in case the feedback message indicates that the data packet has not been received successfully.

Further, the mobile station may be especially adapted to perform the hybrid automatic repeat request method described above. In the latter case, the transmitting entity corresponds to the mobile station, while the receiving entity corresponds to the base station.

Another embodiment of the present invention provides a mobile station for transmitting data packets to a base station using a HARQ retransmission protocol applying soft combining of data packets in a mobile wireless communication system comprising the mobile station and the base station. In this embodiment, the mobile station may comprise receiving means for receiving a retransmission mode indicator in a control message, wherein the retransmission mode indicator indicates whether to perform a packet retransmission method according to the HARQ method described above or whether to perform a hybrid automatic repeat request method different therefrom. Further, the mobile station may comprise transmissions means for performing packet retransmissions according to an packet retransmission mode indicated by the retransmission mode indicator.

In an embodiment of the present invention, the control message is a radio bearer setup message. The control message may be a radio resource (RRC) control message.

According to a further embodiment of the present invention the receiving means may be adapted to receive the control message for an established data channel. The mobile station may further comprise switching means for switching the packet retransmission mode of the transmission means in accordance with the retransmission mode indicator.

In a preferred embodiment of the present invention, the control message is a radio bearer reconfiguration message for configuring the data channel, i.e. here a radio bearer. Again, the control message may be a radio resource (RRC) control message.

According to another embodiment of the present invention, no explicit signaling of the mode in which the retransmission of data packets is performed, i.e. using the HARQ method outlined above or another version thereof. In this embodiment, the transmission means may be adapted to perform one of different hybrid automatic repeat request methods in response to the scheduling mode employed for data transmission. Hence, the scheduling mode, e.g. performing scheduling in the time and rate controlled scheduling mode or the rate controlled scheduling mode, may be used for determining the use of the appropriate HARQ retransmission method.

Another embodiment of the present invention provides a base station for transmitting data packets to a mobile station using a HARQ retransmission protocol applying soft combining of data packets in a mobile wireless communication system comprising the mobile station and the base station. The mobile station may comprise receiving means receiving a feedback message from the receiving entity at the transmitting entity, wherein the feedback message indicates whether a data packet has been successfully received by the receiving entity, and transmitting means for transmitting a retransmission data packet for the data packet after a predetermined time span upon having received the feedback message, in case the feedback message indicates that the data packet has not been received successfully.

Further, the base station may be especially adapted to perform the hybrid automatic repeat request method described above. In the latter case, the transmitting entity corresponds to the base station, while the receiving entity corresponds to the mobile station.

As for the mobile station above, the transmission means in the base station may be adapted to perform one of different hybrid automatic repeat request methods in response to the scheduling mode employed for data transmission.

Further, the present invention provides in another embodiment a radio network controller configuring parameters of a HARQ retransmission protocol used for data transmissions by a mobile station in a mobile wireless communication system comprising the mobile station and the radio network controller. The radio network controller may comprise transmitting means for transmitting a retransmission mode indicator in a control message to the mobile station, wherein the retransmission mode indicator indicates whether to perform a hybrid automatic repeat request protocol according to the method outlined above or whether to perform a hybrid automatic repeat request method different therefrom.

Moreover, another embodiment of the present invention provides a communication system comprising a mobile station and a base station according to the present invention. The communication system may further comprise a radio network controller as described above.

BRIEF DESCRIPTION OF THE FIGURES

In the following the present invention is described in more detail in reference to the attached figures and drawings. Similar or corresponding details in the figures are marked with the same reference numerals.

FIG. 9 shows the operation of a time and rate controlled scheduling mode.

DETAILED DESCRIPTION OF THE INVENTION

One aspect of the present invention is the introduction of a synchronous transmission timing for the packet retransmissions. Retransmissions for previously incorrectly received data packets may be transmitted after a predefined time span upon having received a negative acknowledgement from the receiver.

If the decoding of a received data packet has not been successful, a Node B may transmit a negative acknowledgement (NACK) to the user equipment in the downlink. Since retransmissions are sent at a predetermined point of time, the Node B does not need to schedule the retransmission even in the case, that transmission on an E-DCH is carried out in the time and rate controlled scheduling mode. Hence, no scheduling assignment message needs to be transmitted to the user equipment. Furthermore the Node B is aware of the time instant when retransmissions will be transmitted from the user equipment and may thus reserve resources for the transmission of retransmission data packets. The knowledge of the retransmission timing may be taken into account for the scheduling of other user equipments, i.e. the scheduler may e.g. decide to reduce the amount of initial data packet transmissions of other user equipments in case a large number of retransmissions is expected.

Figure 11:
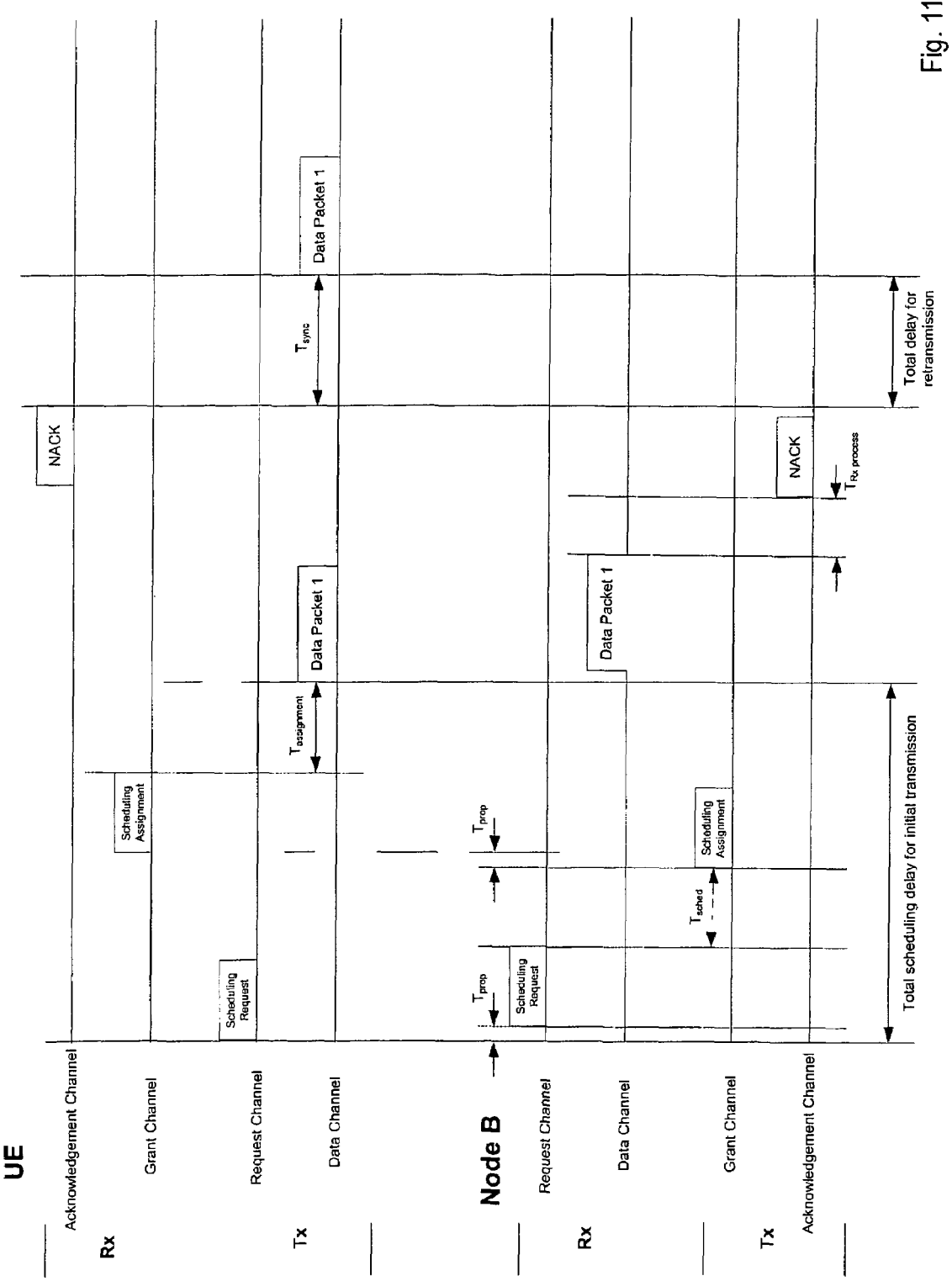
FIG. 11 shows the operation of a HARQ retransmission protocol with synchronous retransmissions according to an embodiment of the present invention.
Figure 12:
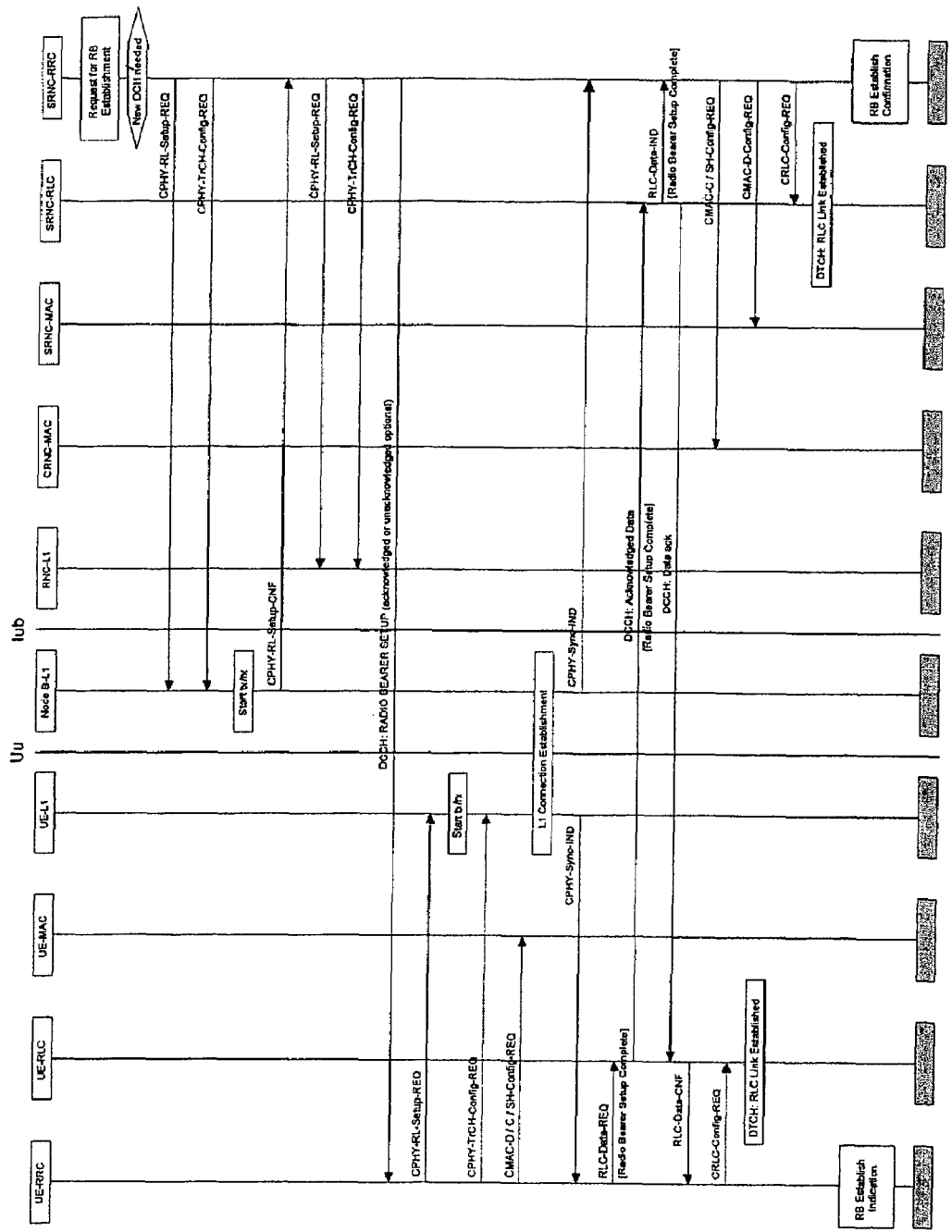

Upon receiving a negative acknowledgement at the user equipment, the retransmission data packet for the erroneous data packet is transmitted after a predefined time span, i.e. at a predetermined point in time relative to the reception time of the negative acknowledgement. In FIG. 11 data transmission in the time and rate controlled scheduling mode with synchronous retransmissions employing E-DCH is shown. Retransmissions may be sent after a predefined time upon having received the negative acknowledgement, which is in the figure denoted as $T_{sync}$. The user equipment does not need to transmit a scheduling request for the retransmission nor does it have to monitor the scheduling related control channel for a scheduling assignment message transmitted from the Node B.

Besides the reduced signaling overhead (Scheduling Request, Scheduling Assignment) and delay benefits obtained by synchronous retransmissions when E-DCH transmission is carried out in time and rate controlled scheduling mode, there may also be a benefit of synchronous retransmission for the rate controlled scheduling mode.

In this scheduling mode the transmission timing may be chosen autonomously by the user equipment. Hence, the Node B scheduler may be unaware of the time when data is transmitted on E-DCH. According to one embodiment of the present invention retransmission data packets are transmitted $T_{sync}$ after having received the negative acknowledgement such that Node B scheduler may be at least aware of the transmission timing of retransmission data packets. Therefore, it may reserve resource for the retransmissions and hence has a more precise control on the uplink interference in the cell.

Figure 1:
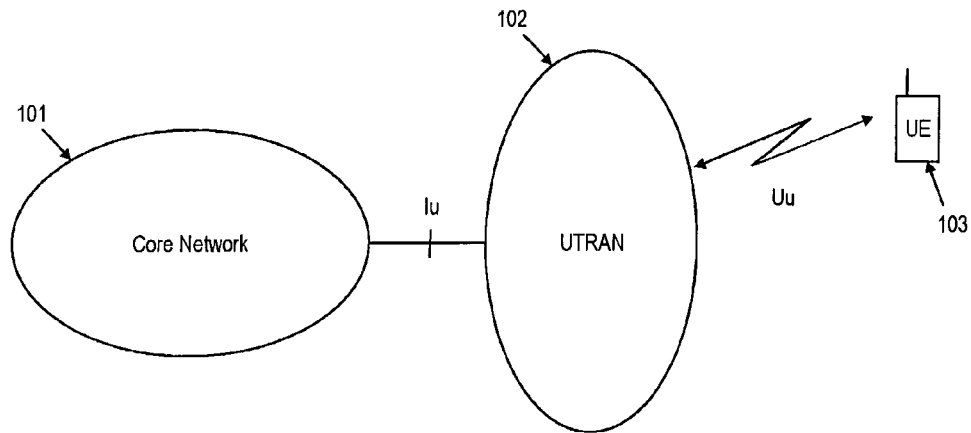
FIG. 1 shows the high-level architecture of UMTS.
Figure 2:
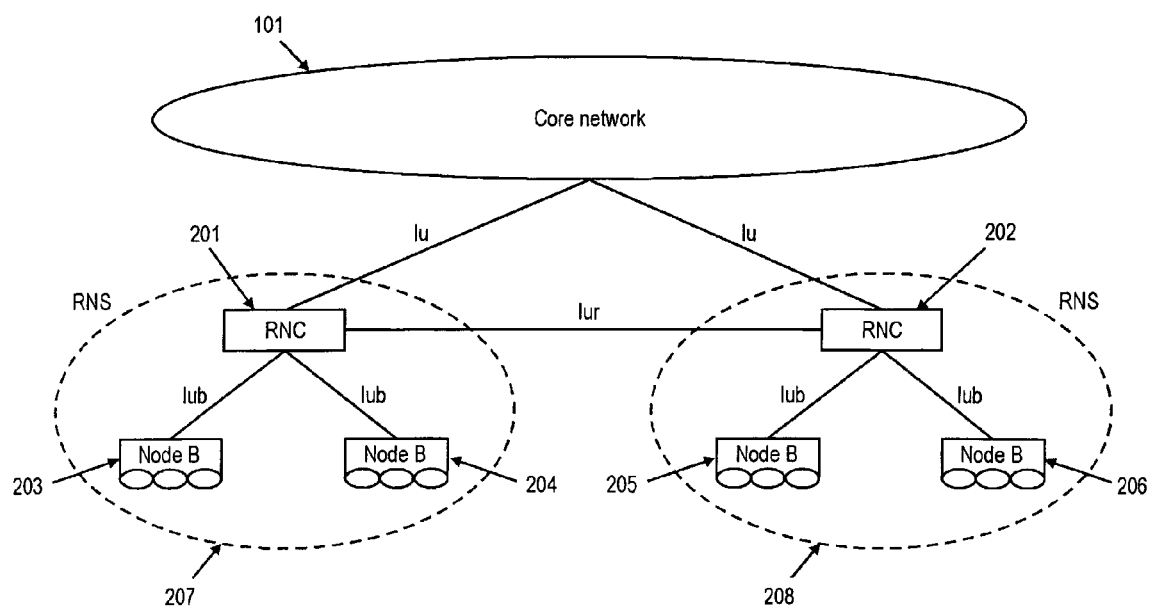
FIG. 2 shows the architecture of the UTRAN according to UMTS R99/4/5.
Figure 3:
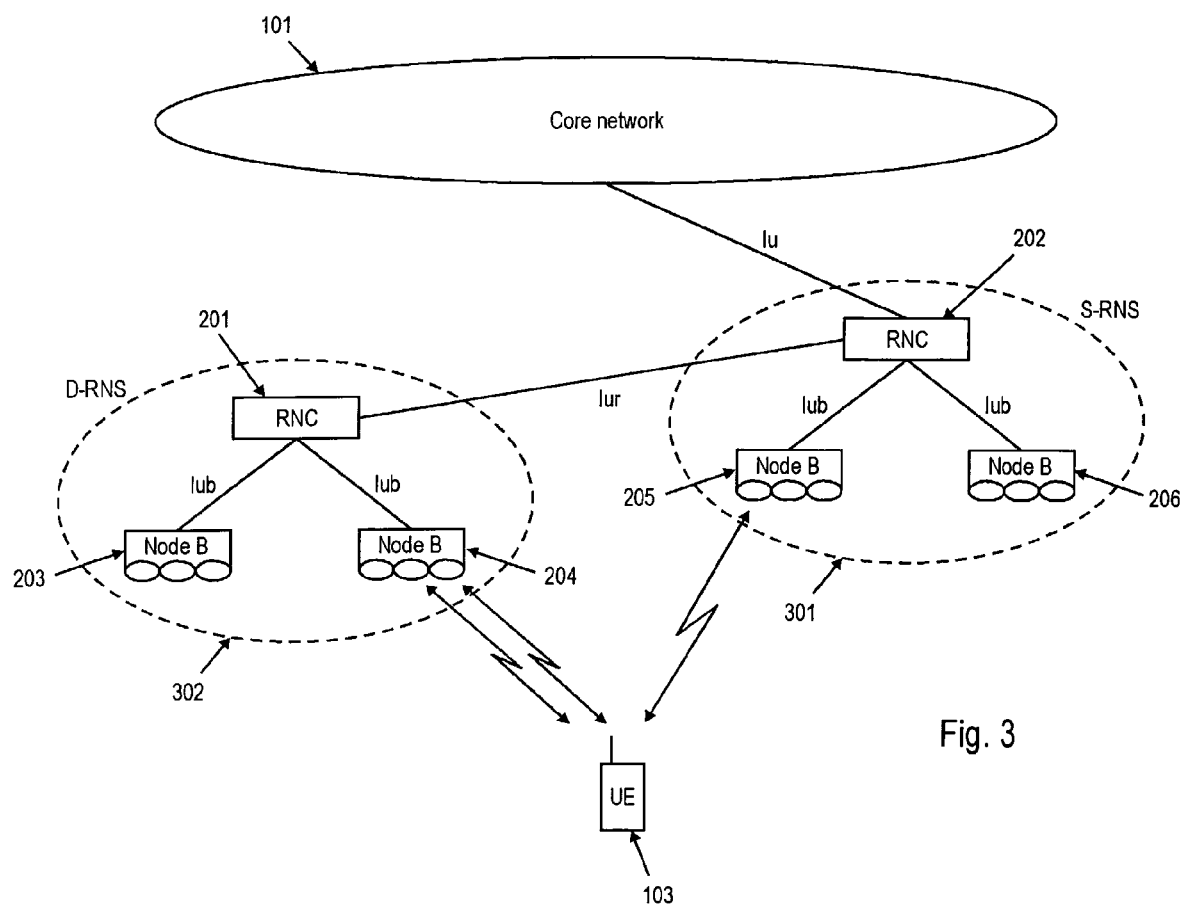
FIG. 3 shows a Drift and a Serving Radio Subsystem.
Figure 4:
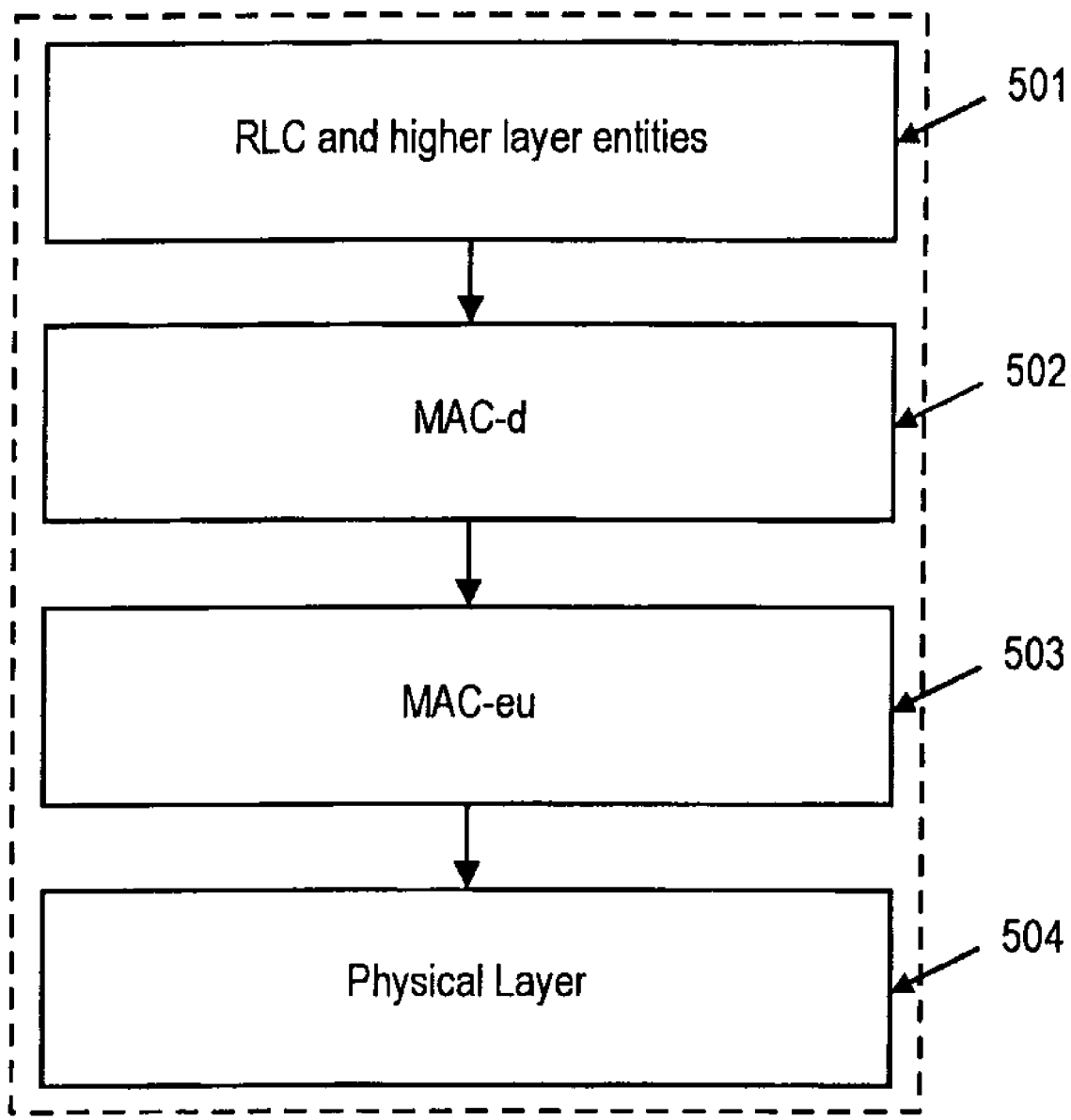
FIG. 4 shows the E-DCH MAC architecture at a user equipment.
Figure 5:
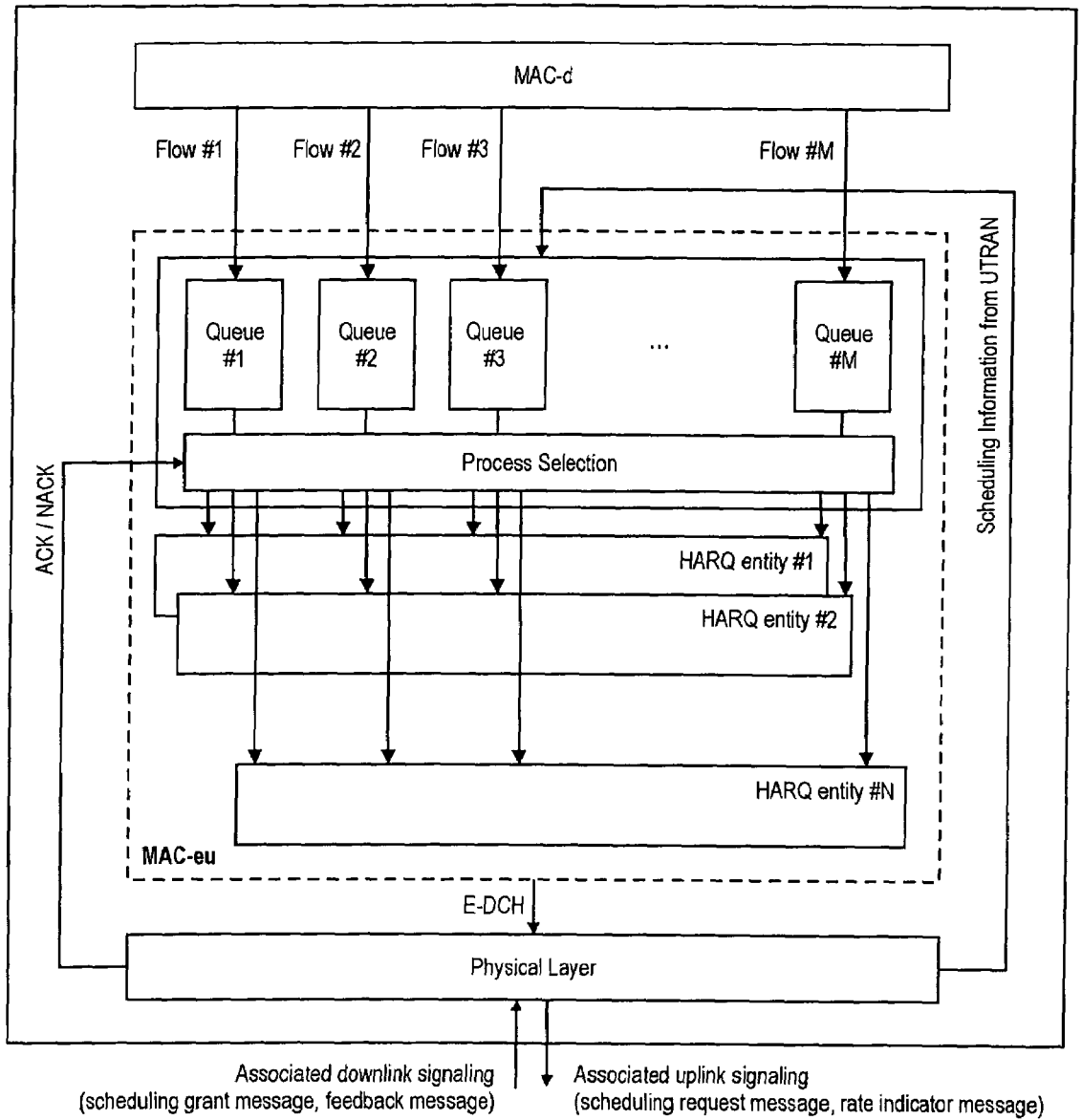
FIG. 5 shows the MAC-eu architecture at a user equipment.
Figure 6:
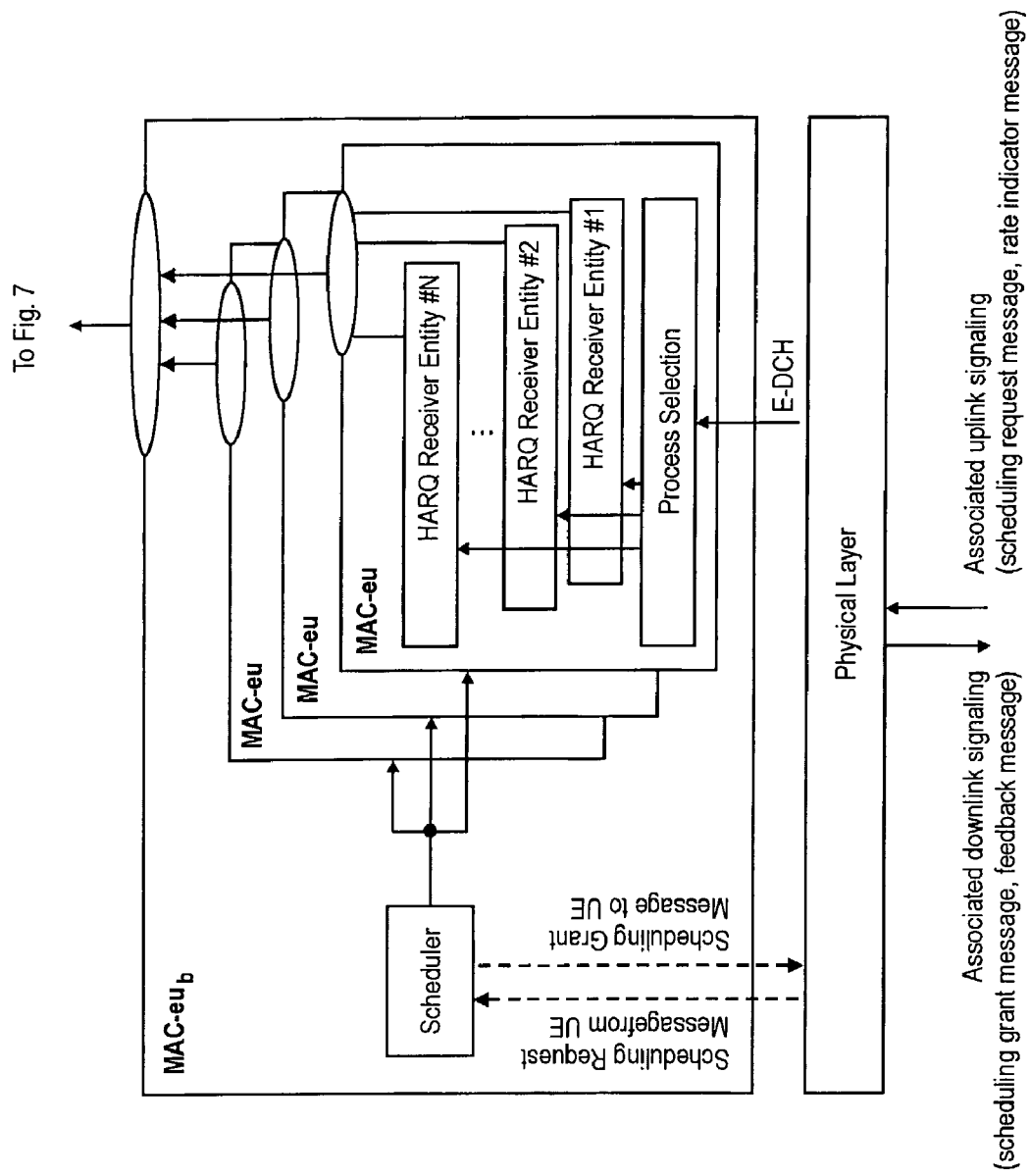
FIG. 6 shows the MAC-eu architecture at a Node B.
Figure 7:
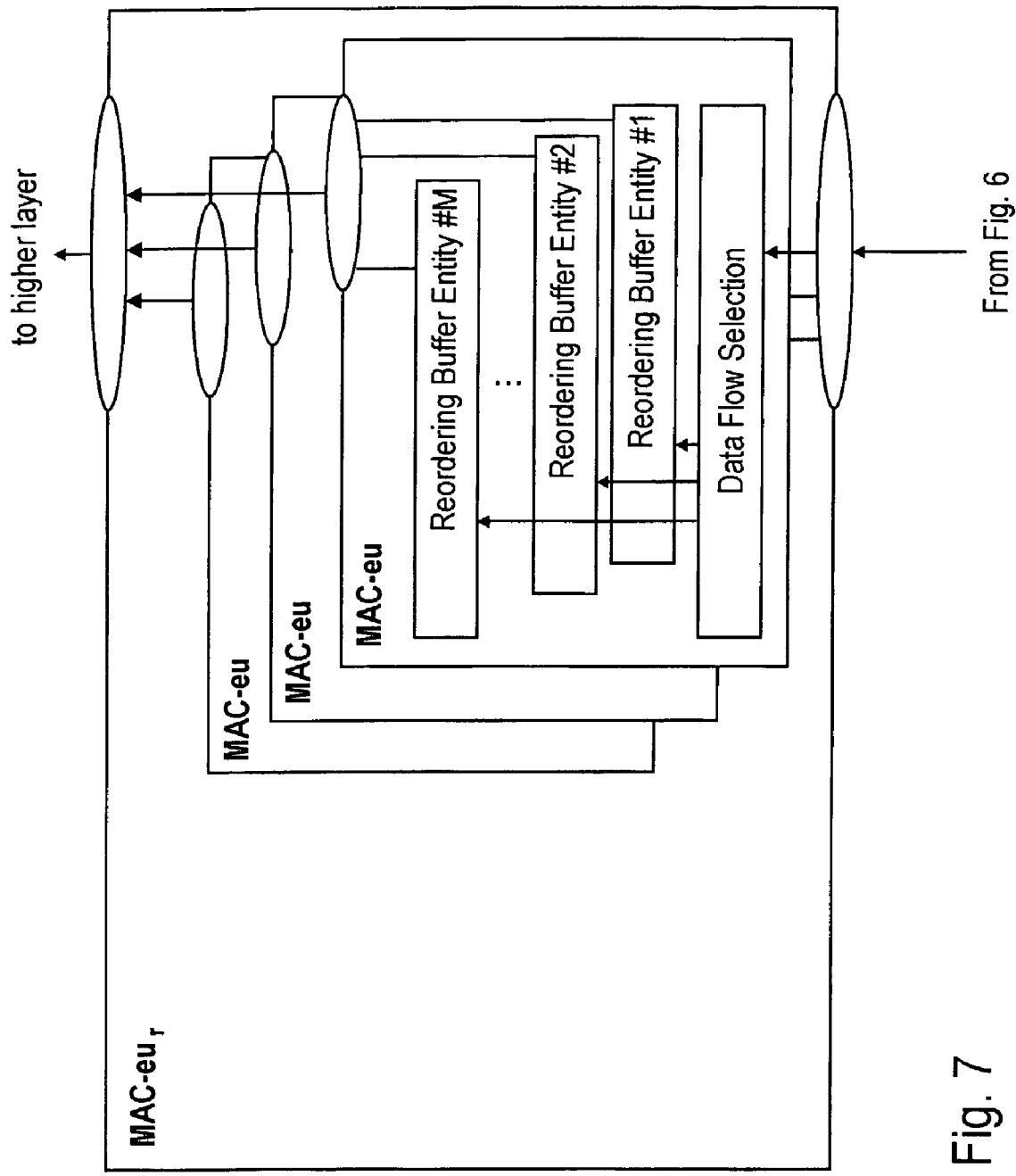
FIG. 7 shows the MAC-eu architecture at a RNC.
Figure 8:
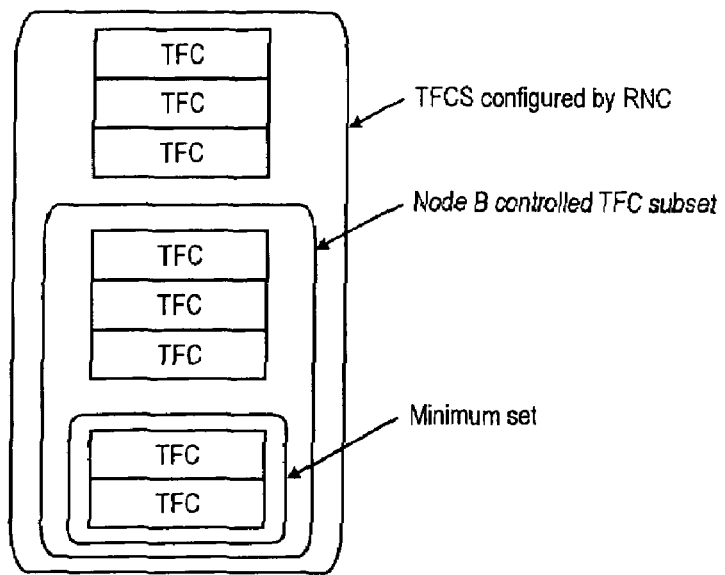
FIG. 8 shows transport format combination sets for Node B controlled scheduling.

In case there is other data of logical channels pending for transmission in the user equipment besides a retransmission and the maximum transport format combination in the "Node B controlled TFC Subset" (see FIG. 8) is not sufficient to send the retransmission and the pending data simultaneously, data pending for transmission and retransmission data packets may be transmitted according to the logical channel priorities. In case pending data packets have for example a higher logical channel priority than the retransmission, the user equipment may transmit the pending data packets and abort the retransmission. user equipment may send the retransmission data packet at a later point of time.

Hence, in this embodiment of the present invention a simultaneous transmission of data pending for transmission and a retransmission data packet is not possible due to not having sufficient resources available at the user equipment. E.g. no transport format combination may be available in the user equipment's TFCS allowing the simultaneous transmission.

Another embodiment of the present invention is related to situations where, due to power limitations in the uplink, the power that may be used for transmitting a retransmission data packet in a given transmission time interval is not sufficient, e.g. due to simultaneously higher priority real time services. In order to send a retransmission even in this case synchronously, user equipment could use only the remaining power for the retransmission. Therefore the reliability of the retransmission is decreased due to the reduced transmission power. However since soft combining of the retransmission with previously stored transmissions of that data packet is done before decoding, a successful decoding is still possible.

According to one exemplary embodiment of the present invention it may be assumed that the TFC Selection for data transmission on the E-DCH is in the MAC-e entity of the user equipment whereas the TFC Selection for Rel99/5 DCH channels is done in the MAC-d entity. The TFC selection in the user equipment may be performed in accordance to the logical channel priorities. High priority data may e.g. be assigned transport formats requiring a high transmission power while data with low priority are assigned transport formats which require a low power level for transmission. The priorities may be indicated using RRC signaling.

Thus, power resources may be allocated for the TFC Selection in MAC-d and respectively for TFC Selection in MAC-e according to the logical channel priorities. The user equipment's transmit power estimation—performed by the physical layer—for a given TFC may be obtained by measuring the transmitted power over the measurement period of one slot, and gain factors of the corresponding TFC. In order to send the retransmission even when the remaining power—i.e. the difference between the maximum power the user equipment may use for transmission and the power required by a TFC for the transmission of data pending for transmission in the same transmission time interval as the retransmission data packet—is not sufficient for supporting the required transport format of the retransmission data packet, the gain factor applied to the physical channel used for the E-DCH transmissions (E-DPDCH) may be manipulated.

Using the manipulated gain factor for the transport format of the retransmission data packets it may be achieved that the calculation of the total power required to support the desired TFC for data pending for transmission and the retransmission data packet results in a value that allows the use of the TFC, i.e. is lower than the maximum transmission power the user equipment is allowed to use. The gain factor may be successively decreased until the remaining power is sufficient for the supporting of the retransmission transport format and thus the use of the TFC.

In order to allow the physical layer to use the manipulated gain factor for the measurements and calculation, the manipulation of the gain factor may be indicated by a primitive signaled from MAC sublayer to the physical layer. The physical layer may e.g. determine the appropriate gain factor.

Alternatively the user equipment may abort the retransmission and send it at a later point of time. In the latter case and if data transmission is performed in a the time and rate controlled scheduling mode, the user equipment may abort the retransmission and sent a scheduling request for the transmission of the data packet as soon as user equipment power situation allows. The data packet should be treated like an initial transmission and scheduled from Node B. For the rate controlled scheduling mode the user equipment may abort the retransmission after the predefined time span upon having received the negative acknowledgement and may transmit the data packet autonomously as soon as the user equipment's power situation allows. Once a Node B has sent a negative acknowledgement to the user equipment, it may expect a retransmission for this data packet after a predefined fixed delay. In case the retransmission is not received at this point in time, the Node B may not flush the soft buffer, but wait for a scheduling request for this data packet when scheduling is performed in the rate and time controlled scheduling mode or for the retransmission of this packet at a later point of time in case scheduling is performed in the rate controlled scheduling mode.

Figure 13:
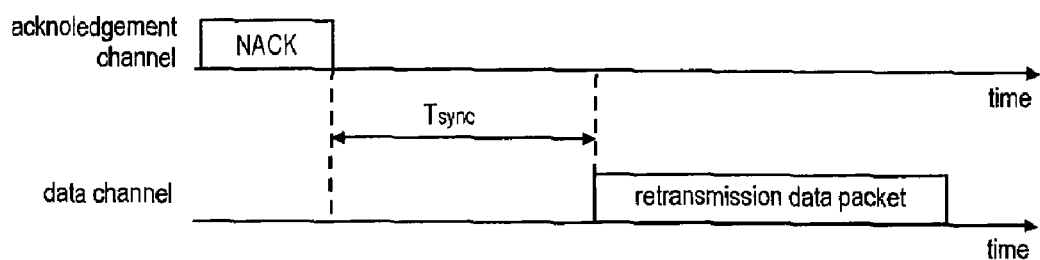
FIG. 12 shows a Radio Bearer Establishment with Dedicated Physical Channel Activation and FIG. 13 shows the timing relation between a negative acknowledgement and the transmission of a retransmission data packet according to an embodiment of the present invention.
Figure 10:
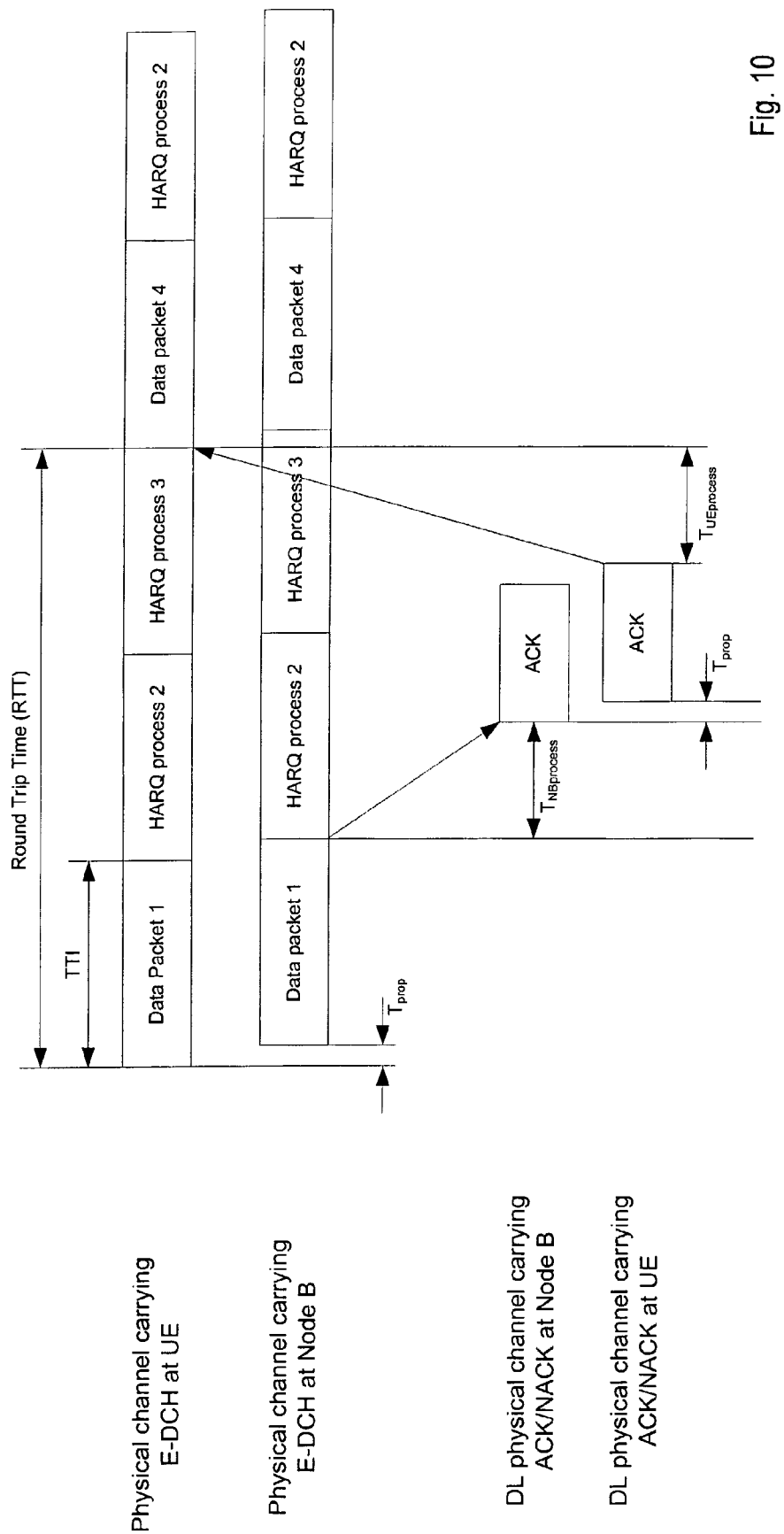
FIG. 10 shows a the operation of a 3-channel stop-and-wait HARQ protocol.

The relative timing between the negative acknowledgement and the retransmission is shown in FIG. 13. The time offset $T_{sync}$ could be a fixed amount of time as for example the time offset between HS-DSCH and HS-DPCCH. However, there may be no frame synchronization across E-DCHs of different users in that case.

Alternatively, the user equipment may send the retransmission in the first transmission time interval after having received the negative acknowledgement provided the time between the end of the slot of the feedback message (NACK) and the start of the retransmission is at least some minimum, in order to allow processing of the negative acknowledgement at the user equipment. In this case $T_{sync}$ may vary within one transmission time interval length, assuming that the retransmission may be transmitted at the beginning of a frame boundary. This may ensure that the retransmission is sent aligned to the frame structure of the E-DCH. E-DCH transmissions may thus be synchronized across for the user equipments. Node B is aware of the transmission time interval when the retransmission of the data packet is sent.

Before starting of any transmission a radio bearer must be established and all layer must be configured accordingly. A radio bearer establishment procedure may be used to establish one or more new radio bearers. The procedure may be amended in that a retransmission type indicator may be included in the signaling between RNC and UE indicating the HARQ retransmission protocol type to use, e.g. whether to use the HARQ protocol suggested by the present invention or whether to use a HARQ protocol different therefrom. Based on the QoS parameters of an application/service, the radio resource control may determine the radio bearer parameters that are most appropriate for carrying data of the application/service.

Depending on the service transmitted over an E-DCH, it might be either more or less beneficial to send the retransmissions synchronously. For services, which require E-DCH transmission with high data rates, it may be for example advantageous to send retransmissions synchronously. However, for some other services it may be more beneficial to send the retransmissions asynchronously.

Depending on the service, which should be transmitted over an E-DCH, the RRC may define whether the retransmission should be done synchronously or asynchronously. The retransmission mode may be a radio bearer parameter, which is set during the radio bearer establishment procedure. More generally, a retransmission type indicator may be included in a control message sent to the mobile station. The retransmission type indicator may indicate the appropriate HARQ scheme to employ for data transmission.

It may be also possible to change radio bearer properties in the course of an active connection. A radio bearer reconfiguration procedure may used to reconfigure parameters for a radio bearer. Thus, the retransmission mode for an active connection may be changed, if necessary. The radio bearer reconfiguration procedure as well as the radio bearer setup procedure would have to be adapted such that same indicate the appropriate packet retransmission scheme to employ, e.g. to use an HARQ protocol providing either synchronous or asynchronous retransmissions.

According to another embodiment of the present invention instead of defining the retransmission mode using a retransmission type indicator, the retransmission mode may also be set according to the scheduling mode used for E-DCH transmission. A HARQ protocol with synchronous retransmissions timing may have the advantage of a reduced signaling overhead (scheduling request and scheduling assignment message) and reduced delay compared to a HARQ protocol with scheduled retransmissions for E-DCH transmission in the time and rate controlled scheduling mode. Furthermore retransmissions may always be prioritized.

According to another embodiment of the present invention, retransmissions may be send synchronously for the time and rate controlled scheduling mode. Due to the fact that benefits of synchronous retransmissions for transmissions in the rate controlled scheduling mode may not be that significant, retransmissions may be sent asynchronously for E-DCH transmission in the rate controlled scheduling mode.

Though the description has mainly been given with respect to uplink data transmission using an E-DCH, it should be noted that the principles described herein are also applicable data transmission on dedicated downlink data channels.

The invention claimed is:

1. A method for transmitting uplink data packets via an uplink data channel to a base station in a mobile wireless communication system comprising a mobile station and the base station using a hybrid automatic repeat request (HARQ) retransmission protocol applying soft combining of data packets and applying synchronous retransmissions, the method comprising the following steps performed by the mobile station:

transmitting a data packet to the base station via the uplink data channel, receiving a feedback message from the base station, wherein the feedback message indicates that the data packet has not been successfully decoded by the base station, and determining whether the transmission power required for synchronously transmitting a retransmission data packet for the unsuccessfully decoded data packet at a predetermined point in time after having received the feedback message and for transmitting other uplink data within the same transmission time interval is lower than a maximum allowed transmission that the mobile station is allowed to utilize for transmitting uplink data, wherein the other uplink data is prioritized over the retransmission data packet; and synchronously transmitting the retransmission data packet at the predetermined point in time and transmitting the other data using the maximum allowed transmission power, if the required transmission power is larger than the maximum allowed transmission power.

2. The method according to claim 1, wherein the retransmission data packet is transmitted at a transmission power lower than required for its transport format.

3. The method according to claim 1, further comprising the step of decreasing the gain factor of a physical channel to be used for transmitting the retransmission data packet, at the predetermined point in time after having received the feedback message, if the transmission power required for transmitting the retransmission data packet at the predetermined point in time and the other data within the same transmission time interval exceeds the maximum transmission power the user equipment is allowed to utilize for uplink data transmission.

4. The method according to claim 3, wherein in the step of transmitting the retransmission data packet at the predetermined point in time after having received the feedback message, the retransmission data packet is transmitted via the physical channel using the decreased gain factor.

5. The method according to claim 4, wherein the decreased gain factor reduces the transmission power for transmitting the retransmission data packet to a value such that the total transmission power required for the transmission of the retransmission data packet and the transmission power required for transmitting the other uplink data is equal to the maximum allowed transmission power the mobile station is allowed to utilize for uplink data transmission.

6. The method according to claim 3, wherein the decreased gain factor is determined by the physical layer.

7. The method according to claim 1, further comprising:

performing a transport format combination selection for the transmission of uplink data by the MAC-d entity of the mobile station and subsequently performing a transport format combination selection for the transmission of uplink data packets on the uplink data channel by the MAC-e entity of the mobile station.

8. The method according to claim 7, wherein the transport format combination selection by the MAC-e entity considers a remaining transmission power the mobile station is allowed to use in a transmission time interval, wherein the remaining transmission power is the transmission power remaining after performing the transport format combination selection by the MAC-d entity.

9. The method according to claim 7, wherein the transport format combination selection in the MAC-e entity is done in accordance with the logical channel priorities indicated by radio resource control (RRC) signaling.

10. The method according to claim 1, wherein the retransmission data packet is transmitted at the beginning of a transmission time interval.

11. The method according to claim 1, wherein data transmission is carried out on an enhanced uplink dedicated transport channel (E-DCH).

\* \* \* \* \*